United States Patent
Henning et al.

(10) Patent No.: US 11,591,955 B2
(45) Date of Patent: Feb. 28, 2023

(54) METHOD FOR OPERATING A POWER PLANT

(71) Applicant: Siemens Energy Global GmbH & Co. KG, Munich (DE)

(72) Inventors: Michael Henning, Erlangen (DE); Wolfgang Wiesenmüller, Fürth (DE); Maria Zeis, Hirschaid (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 16/972,579

(22) PCT Filed: Jun. 3, 2019

(86) PCT No.: PCT/EP2019/064277
§ 371 (c)(1),
(2) Date: Dec. 5, 2020

(87) PCT Pub. No.: WO2019/243026
PCT Pub. Date: Dec. 26, 2019

(65) Prior Publication Data
US 2021/0285369 A1    Sep. 16, 2021

(30) Foreign Application Priority Data
Jun. 22, 2018 (DE) ............ 10 2018 210 240.6

(51) Int. Cl.
*F02C 3/14* (2006.01)

(52) U.S. Cl.
CPC ............ *F02C 3/14* (2013.01); *F05D 2220/32* (2013.01); *F05D 2220/72* (2013.01); *F05D 2270/3011* (2013.01)

(58) Field of Classification Search
CPC ...................... F01K 23/103; F01K 23/105
See application file for complete search history.

(56) References Cited

U.S. PATENT DOCUMENTS

| | | | | |
|---|---|---|---|---|
| 3,505,811 A | * | 4/1970 | Underwood | F01K 23/105 60/773 |
| 3,879,616 A | * | 4/1975 | Baker | F01K 23/105 290/40 R |
| 5,069,030 A | * | 12/1991 | Moore | F01D 21/00 60/39.27 |
| 10,387,775 B2 | | 8/2019 | Cheng | |

(Continued)

FOREIGN PATENT DOCUMENTS

| | | |
|---|---|---|
| CN | 102628378 B | 1/2015 |
| DE | 102016113660 A1 | 1/2017 |

(Continued)

OTHER PUBLICATIONS

V. Ganapathy,"Heat-Recovery Steam Generators: Understand the Basics," Chemical Engineering., pp. 32-45, Aug. 1996 (Year: 1996).*

(Continued)

*Primary Examiner* — Todd E Manahan
*Assistant Examiner* — David P. Olynick
(74) *Attorney, Agent, or Firm* — Wolter Van Dyke Davis, PLLC

(57) ABSTRACT

A method for operating a power plant having a gas turbine, a heat recovery steam generator, a steam turbine, an auxiliary heat source, and a control system, wherein the method includes controlling the power plant such that the heat recovery steam generator receives an input of heat from the gas turbine; determining the gas turbine is operating at its maximum capacity or at an upper end of its control range and the power plant is operating at less than a target value for a power plant capacity; determining a target pressure value immediately upstream of the steam turbine, wherein the target pressure value is derived from a primary pressure for the steam turbine and a steam turbine capacity for the steam turbine; based upon the target pressure value, controlling the heat store to release heat into the heat recovery steam generator to achieve the predefined power plant capacity.

12 Claims, 1 Drawing Sheet

(56) References Cited

U.S. PATENT DOCUMENTS

| | | | |
|---|---|---|---|
| 2010/0275610 A1* | 11/2010 | Oguchi | F01K 13/02 60/773 |
| 2010/0305768 A1 | 12/2010 | Holt et al. | |
| 2012/0240589 A1 | 9/2012 | Tateishi et al. | |
| 2014/0345278 A1 | 11/2014 | Pickard et al. | |
| 2015/0159518 A1* | 6/2015 | Baramov | F22B 1/1815 60/645 |
| 2016/0169154 A1* | 6/2016 | Rao | F02C 9/16 701/100 |
| 2017/0022846 A1* | 1/2017 | Rao | F02C 6/18 |
| 2018/0038352 A1 | 2/2018 | Conlon | |
| 2018/0094546 A1 | 4/2018 | Conlon | |

FOREIGN PATENT DOCUMENTS

| | | |
|---|---|---|
| EP | 1072760 A1 | 1/2001 |
| GB | 2352778 A | 2/2001 |
| JP | S5985404 A | 5/1984 |
| JP | H07332023 A | 12/1995 |
| WO | 2006097495 A2 | 9/2006 |
| WO | 2012150969 A1 | 11/2012 |

OTHER PUBLICATIONS

Claire Soares, "Gas Turbines: A Handbook of Air, Land and Sea Applications," Second Edition, Copyright 2015, 2008 Elsevier Inc.., chapter 3. (Year: 2015).*

PCT International Search Report and Written Opinion of International Searching Authority dated Sep. 2, 2019 corresponding to PCT International Application No. PCT/EP2019/064277 filed Jun. 3, 2019.

Tan, Wen "Linear Analysis and Control of a Boiler-Turbine Unit" Proceedings of the 17th World Congress, The International Federation of Automatic Control, Seoul, Korea, Jul. 6-11, 2008.

* cited by examiner

METHOD FOR OPERATING A POWER PLANT

CROSS REFERENCE TO RELATED APPLICATIONS

This application is the US National Stage of International Application No. PCT/EP2019/064277 filed 3 Jun. 2019, and claims the benefit thereof. The International Application claims the benefit of German Application No. DE 10 2018 210 240.6 filed 22 Jun. 2018. All of the applications are incorporated by reference herein in their entirety.

FIELD OF INVENTION

The invention relates to a method for operating a power plant.

BACKGROUND OF INVENTION

In future, it is assumed that plants for generating electricity in a deregulated power market will increasingly be required to operate in an extremely flexible manner, simultaneously combined with the maximum possible efficiency.

Increased flexibility in gas and steam turbine plants can be achieved e.g. by means of capacity-increasing measures such as, e.g. chillers, and/or by the employment of auxiliary heat sources such as, e.g. auxiliary burners and/or heat stores.

To date, these measures have either been executed manually, according to the best available knowledge and experience of operating personnel, or an automatic operating mode has been implemented which, on the basis of a complex thermal balance calculation for the entire power plant (potentially involving the extraction of process steam or district heat), calculates a pre-controlled target value (e.g. a burner capacity target value) for an auxiliary burner and/or a discharge capacity of a thermal store, with the resulting necessity for the correction of the residual control deviation (e.g. a control pressure deviation) using a slow-acting corrective controller.

SUMMARY OF INVENTION

As the above-mentioned measures generally impair efficiency, the object of the invention is the provision of a method wherein the execution of said measures is automated such that they are only implemented to the degree actually required. This is the only means of achieving maximum power plant efficiency. For plants employed in isolated operation, this additionally requires that capacity-increasing measures are executed such the primary control element (e.g. the gas turbine, for frequency control) is consistently maintained within the control range.

The invention fulfils this method-oriented object, wherein it provides that, in a method of this type for operating a power plant having a gas turbine, a heat recovery steam generator connected downstream of the gas turbine, a steam turbine connected to the heat recovery steam generator and an auxiliary heat source, a target pressure value is set immediately upstream of the steam turbine, in order to achieve a predefined power plant capacity.

The method according to the invention advantageously employs the status of a primary control element, in order to calculate a corresponding target value which is deduced therefrom (the target pressure value), such that the plant automatically operates with maximum efficiency at all times.

Appropriately, the primary control element is a gas turbine capacity.

It is further appropriate that the target pressure value is a target value for the auxiliary heat source.

In an advantageous form of embodiment of the method according to the invention, an auxiliary burner arranged in the heat recovery steam generator is employed as an auxiliary heat source. The steam output, and thus the electric power output of the steam turbine, can be reliably improved as a result.

In an alternative configuration of the method according to the invention, a heat store is employed as an auxiliary heat source. If required, heat is released from this store, and the steam pressure is thus further increased upstream of the steam turbine. The store can be arranged either in the heat recovery steam generator or in the direction of flow of steam downstream of the heat recovery steam generator. Moreover, a heat store of this type can also be employed additionally to an auxiliary burner.

In an advantageous manner, a change in the status of the primary control element is converted, by means of amplification, into a target pressure value variation, which is added to a current actual pressure.

Finally, it is advantageous if the auxiliary heat source is only operated in the event that a target value for power plant capacity cannot be achieved or maintained by means of the gas turbine, within its control range, and the steam turbine alone.

The invention makes use of the linear relationship between the primary pressure and steam turbine capacity. If, for example, more capacity is required, and the gas turbine is already operating either at its maximum capacity or at the upper end of its stipulated control range, an increase in the fresh steam pressure by means of the auxiliary burner and/or a release from a heat store correspondingly produces more steam for the steam turbine. This is achieved by means of an increase in the target pressure value for the auxiliary heat source, to a value in excess of the current actual pressure value. As the steam turbine capacity increases, either the desired additional capacity is made available in an efficiency-optimized manner, or the desired additional capacity is made available in an efficiency-optimized manner and the gas turbine is maintained within its control range.

According to the novel control concept envisaged, changes in the status of the primary control element are converted, by means of amplification, into an increase in the target pressure value (corresponding to a pre-control). This is added to the current actual pressure. The amplification can be either positive or negative, such that the capacity-increasing measure can automatically be discontinued, in an efficiency-optimized manner, immediately it is no longer required.

The actual pressure thus functions as a system-integrated and intrinsic feedback, as it is solely dependent upon the steam mass flow which, in turn, is influenced by changes in the auxiliary burner and/or releases from the heat store, and in the gas turbine capacity.

A further feature of the present invention is that, by means of the described circuit arrangement, the correct target value (e.g. pressure), subject to the correct parameterization of amplification (i.e. the necessary increase in pressure for the requisite additional capacity of the steam turbine), can be precisely calculated beforehand. This is a particular feature in that, even in the event of a deviation in parameterization, the correct target value, ultimately, is always automatically precisely determined on the basis of the above-described feedback, albeit with a short-term over- or undersetting of the target value, and thus of the capacity-increasing measure. The actual control variable (in this case: capacity) nevertheless remains at the target value from the outset, such that the system assumes a very high degree of inherent stability or error tolerance in response to inaccuracies in parameterization.

This effect of a higher or lower amplification can moreover be employed to restore the gas turbine more rapidly or more slowly to the control range such that, e.g. in the event of higher amplification, capability for the response to the full scope of frequency variations is restored more rapidly or, at lower amplification, operation proceeds overall in an efficiency-optimized manner.

This novel automation concept requires no complex thermal balancing and, likewise, no additional corrective controller. By means of system-inherent feedback, using the fresh steam pressure, complex on-site optimization is no longer required.

This results in significantly reduced complexity, both for engineering and for subsequent in-situ commissioning.

Conversely to a concept involving thermal balancing and a corrective controller, or manual operation, by means of the novel concept envisaged, start-up with a modified target value can be executed immediately in a precise manner.

Using the previous concept, a pre-controlled start-up was initially executed at a corresponding estimated value based upon the thermal balance and, for example, a pressure correction was executed thereafter by means of the slow-acting corrective controller. As a result, the modified target value was invariably achieved more slowly than by means of the novel concept envisaged.

The method according to the invention is not exclusively limited to the generation of electrical energy. Other applications such as, for example, process steam extraction, are also included.

BRIEF DESCRIPTION OF THE DRAWINGS

For exemplary purposes, the invention is described in greater detail with reference to the drawings. In the drawings, which are schematic and not to scale.

DETAILED DESCRIPTION OF INVENTION

Figure 1:
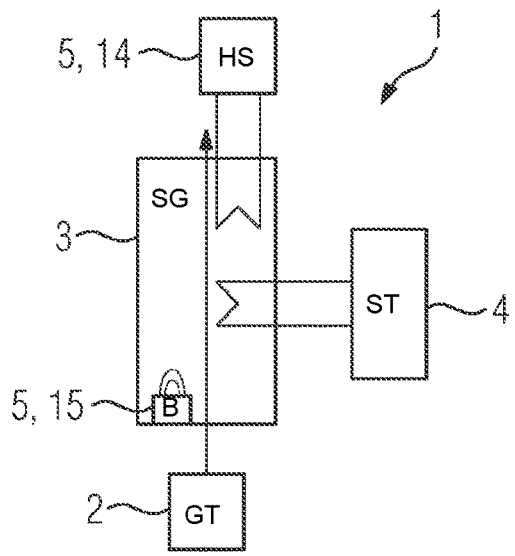
FIG. 1 shows a power plant.

FIG. 1 shows a power plant 1 having a gas turbine (GT) 2, a heat recovery steam generator (SG) 3, a steam turbine (ST) 4 and an auxiliary burner 15 by way of an auxiliary heat source (HS) 5. The gas turbine 2 and the auxiliary burner (B) 15 function as heat sources for the heat recovery steam generator 3 which is arranged downstream of the gas turbine 2, in which fresh steam is generated for the steam turbine 4. Heat can be introduced by means of a release from a heat store 14, alternatively or additionally to the auxiliary burner (B) 15. The heat store 14, as represented, can thus be arranged within the heat recovery steam generator 3, but also externally thereto.

Figure 2:
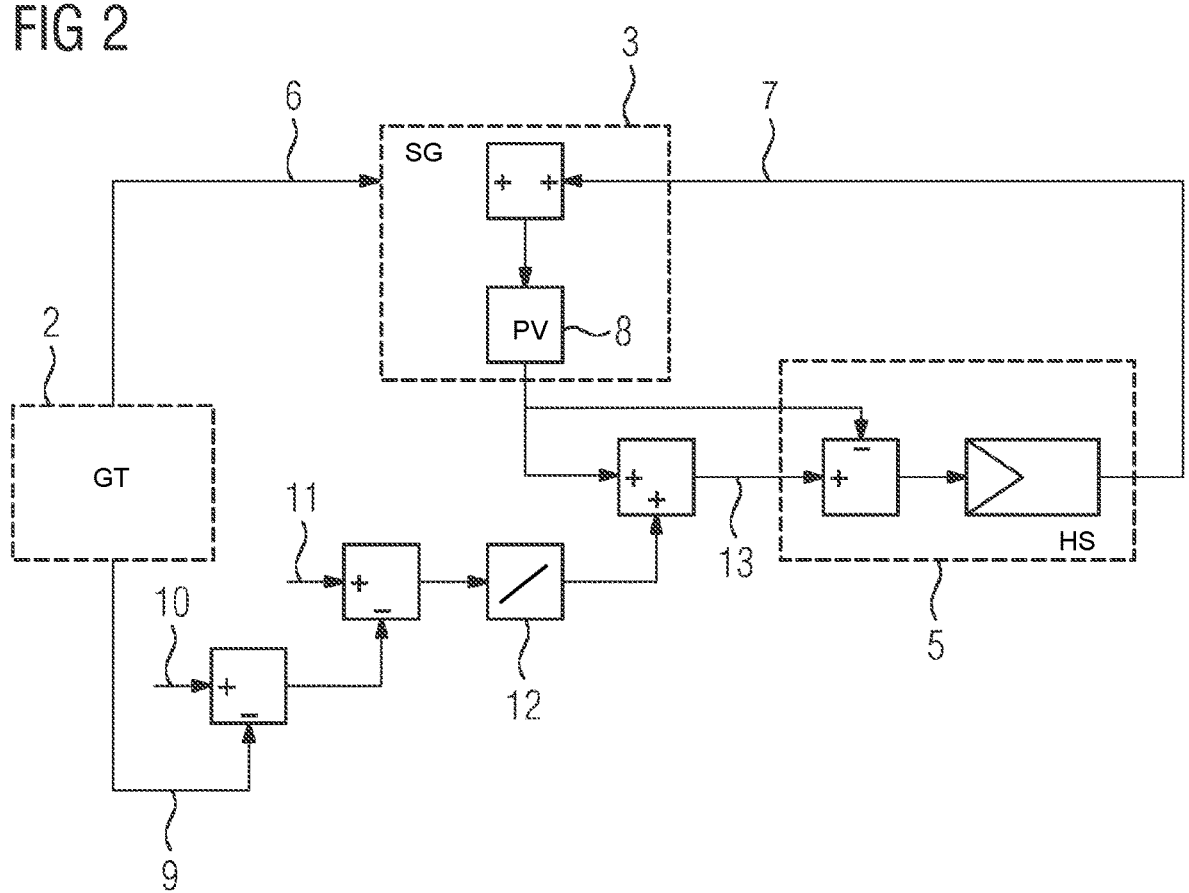
FIG. 2 shows the control system according to the invention, for operating the power plant.

FIG. 2 shows the control system according to the invention for the power plant 1. During the operation of the power plant 1, the heat recovery steam generator (SG) 3 receives an input of heat 6 from the gas turbine (GT) 2 and, optionally, an input of heat 7 from the auxiliary heat source (HS) 5. An actual pressure value (PV) 8 is generated accordingly.

With respect to the gas turbine 2, the actual capacity 9 and the maximum capacity 10 are known. The difference between these values is determined. Optionally, particularly in isolated networks, it is still necessary for a reserve capacity to be maintained for network frequency-stabilizing measures, such that the in-service gas turbine (GT) 2 is not operated up to the technically feasible maximum capacity 10, but only up to a control range limit 11 which lies below the maximum capacity 10.

On the basis of a linear relationship between the steam flux (and the steam turbine capacity) and the pre-pressure only, by means of amplification 12, a target pressure value 13 for the steam pressure immediately upstream of the steam turbine 4 is determined on the basis of values for the gas turbine. This target pressure value 13 is then employed, depending upon the capacity demand of the power plant 1, either as a target value for the gas turbine 2 or, in the event that the gas turbine 2 is already operating in the upper control range, for the auxiliary heat source 5.

The invention claimed is:

1. A method for operating a power plant having a gas turbine, a heat recovery steam generator connected downstream of the gas turbine, a steam turbine connected to the heat recovery steam generator, an auxiliary heat source and a control system, the method comprising:
   controlling, via the control system, the power plant such that the heat recovery steam generator receives an input of heat from the gas turbine;
   determining, by the control system, the gas turbine is operating at its maximum capacity or at an upper end of its control range and the power plant is operating at less than a target value for a power plant capacity;
   in response to determining the gas turbine is operating at its maximum capacity or at the upper end of its control range and the power plant is operating at less than the target value for the power plant capacity, determining, by the control system, a target pressure value immediately upstream of the steam turbine, in order to achieve a predefined power plant capacity,
   wherein the target pressure value is derived from a primary pressure for the steam turbine and a steam turbine capacity for the steam turbine;
   wherein the target pressure value is a target value for the auxiliary heat source;
   wherein the auxiliary heat source is a heat store arranged outside the heat recovery steam generator; and
   based upon the target pressure value, controlling the heat store arranged outside the heat recovery steam generator to release heat into the heat recovery steam generator to achieve the predefined power plant capacity.

2. The method as claimed in claim 1,
   wherein the target pressure value is deduced from a status of a primary control element.

3. The method as claimed in claim 2,
   wherein the status of the primary control element is a capacity of the gas turbine.

4. The method as claimed in claim 2, wherein, based on the status of the primary control element the control system determines a target pressure value variation, which is based on a linear relationship between the primary pressure and the steam turbine capacity for the steam turbine, wherein the variation is added to a current actual pressure upstream of the steam turbine; and wherein the target pressure value is set based on the target pressure value variation and the current actual pressure.

5. The method as claimed in claim 1, wherein the auxiliary heat source is only operated in the event that the target value for the power plant capacity cannot be achieved or maintained by means of the gas turbine, within its control range, and the steam turbine alone.

6. The method as claimed in claim 1, wherein the auxiliary heat source releases heat such that an actual pressure value upstream of the steam turbine is increased and the power plant achieves the predefined power plant capacity.

7. The method as claimed in claim 4, wherein the status of the primary control element is based on a difference between an actual capacity of the gas turbine and one of a maximum capacity or a control range limit of the gas turbine.

8. The method as claimed in claim 7, wherein the target pressure value for the auxiliary heat source is increased by a value in excess of the current actual pressure value upstream of the steam turbine when the actual capacity of the gas turbine is operating at the one of the maximum capacity or the control range limit and the power plant operating at less than the predefined power plant capacity.

9. The method as claimed in claim 4, wherein the heat recovery steam generator receives a first heat input from the gas turbine and a second heat input from the auxiliary heat source and wherein the current actual pressure is based on the first heat input and the second heat input.

10. The method as claimed in claim 1,
wherein the target pressure value is derived from a linear relationship between a primary pressure for the steam turbine and steam turbine capacity for the steam turbine.

11. The method as claimed in claim 10,
wherein, based on the linear relationship, the actual pressure value from the heat recovery steam generator is increased to generate the target pressure value for the steam pressure upstream of the steam turbine, thereby increasing the steam turbine capacity to achieve a target value for power plant capacity.

12. A method for operating a power plant having a gas turbine, a heat recovery steam generator connected downstream of the gas turbine, a steam turbine connected to the heat recovery steam generator, and an auxiliary heat source, the method comprising:
operating the power plant such that the heat recovery steam generator receives an input of heat from the gas turbine;
generating an actual pressure value from the heat recovery steam generator;
determining the power plant is operating at less than a target value for a power plant capacity, and the actual capacity of the gas turbine is operating at a maximum capacity or a control range limit,
determining a target pressure value immediately upstream of the steam turbine for the auxiliary heat source;
wherein the target pressure value is derived from a linear relationship between a primary pressure for the steam turbine and a steam turbine capacity for the steam,
wherein the auxiliary heat source is a heat store arranged outside the heat recovery steam generator; and
based on the linear relationship, controlling the gas turbine and the auxiliary heat source such that the actual pressure value from the heat recovery steam generator is increased to generate the target pressure value for the steam pressure upstream of the steam turbine, thereby increasing the steam turbine capacity to achieve the target value for the power plant capacity.

* * * * *